March 29, 1960 R. T. BURNETT 2,930,451
FRICTION DEVICE
Filed Sept. 14, 1955 4 Sheets-Sheet 1

INVENTOR.
RICHARD T. BURNETT
BY John A. Young
ATTORNEY

March 29, 1960

R. T. BURNETT 2,930,451

FRICTION DEVICE

Filed Sept. 14, 1955

INVENTOR.
RICHARD T. BURNETT
BY
John A. Young
ATTORNEY

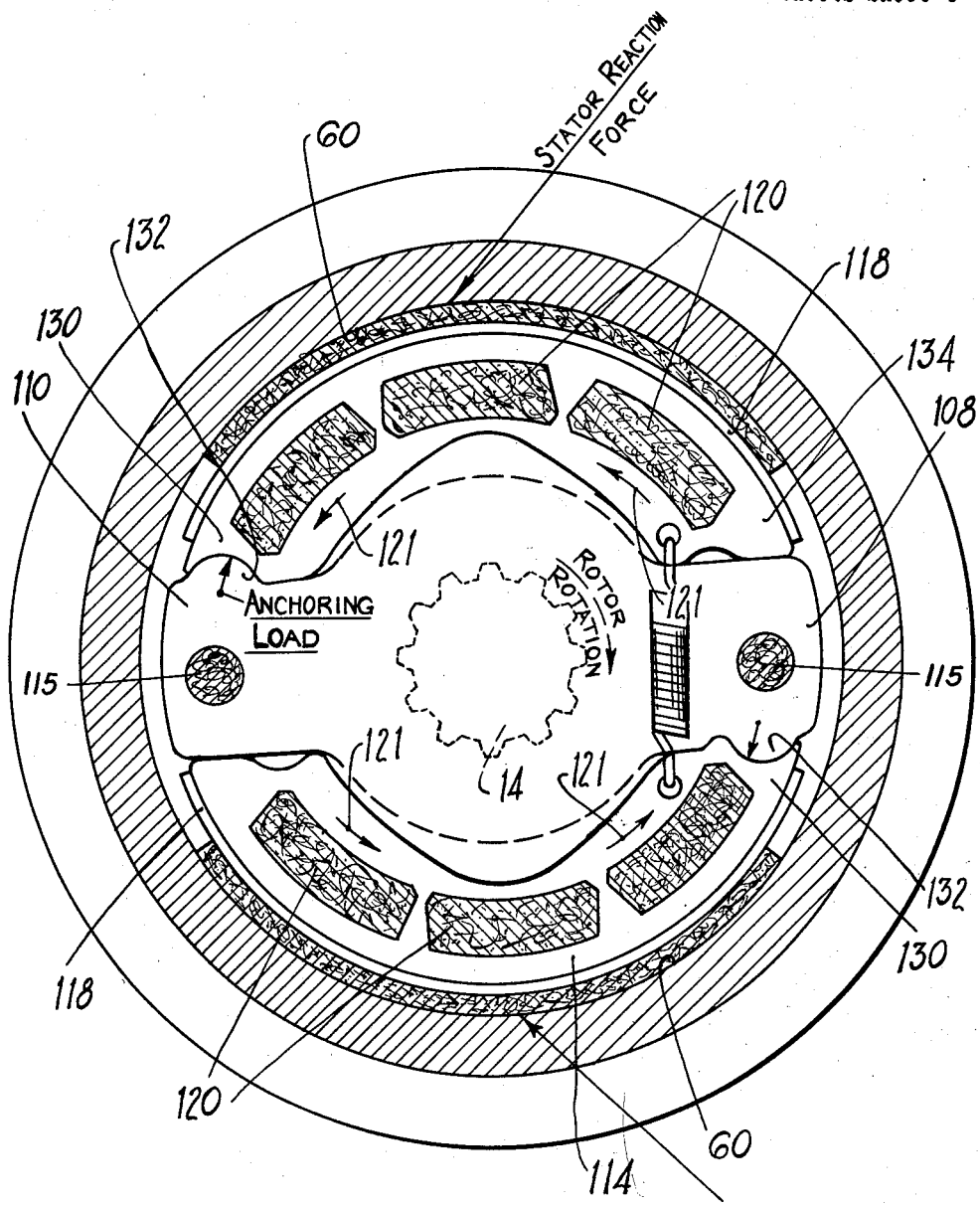

United States Patent Office 2,930,451
Patented Mar. 29, 1960

2,930,451

FRICTION DEVICE

Richard T. Burnett, South Bend, Ind., assignor to Bendix Aviation Corporation, South Bend, Ind., a corporation of Delaware Application September 14, 1955, Serial No. 534,339

8 Claims. (Cl. 188—70)

This invention relates to a friction device which may be adapted for various usages such as brakes, clutches, and the like.

There are numerous difficulties which are met in high kinetic-energy-absorbing requirements for brakes and clutches. Most of these difficulties are traceable to the high temperatures which are developed during usage of the device. As vehicles become larger, and the engine horsepower increases, the various kinetic-energy-absorbing devices will be subjected to even greater demands.

One of the most promising approaches in meeting the increased capacity requirements of friction devices, is the proposal to increase the efficiency in heat dissipation by the device as kinetic-energy is converted to heat energy during operation of the device.

The approach to the problem, as previously stated, is twofold. First of all, the friction element engaging surfaces of the device are increased so that the energy is dissipated over a greater surface; and, second, there is an increase in the mass of the brake to obtain a greater heat reservoir for the thermal energy developed during the stop.

Both of these described features are disclosed and claimed in my copending application 324,167, filed December 5, 1952 and now abandoned in favor of continuation application Serial No. 598,698, filed July 18, 1956, and application No. 325,674, filed December 12, 1952, now abandoned. The present invention is also related to the device shown in application No. 389,212, filed Oct. 30, 1953, now Patent No. 2,857,989, granted Oct. 28, 1958, since both devices are used as tractor brakes and are located on the jackshaft of the tractor.

Both inventions are intended to meet the rigorous conditions of tractor braking. The tractor brakes are utilized not only to control the speed of the tractor but they are also used to steer the tractor so that sharper turning of the tractor is possible than could be obtained with a steering mechanism. In this steering system, either of the rear wheels of the tractors may be held against movement and the released or free turning wheel then swings the tractor in the desired direction.

Some of the present day farming techniques, such as contour plowing, necessitate almost constant use of the tractor brakes and this imposes a heavy burden on the brakes which is reflected by temperature elevation. For this reason, it becomes even more essential to improve the heat resistant qualities of the brake and improve upon the efficiency of the brake to dissipate thermal energy and reduce operating temperatures.

It is a principal object of the invention to improve upon the brake shown in application No. 389,212 by providing a free floating friction unit which increases brake effectiveness and increases wear-life of the friction article.

A further feature of the invention involves an anchoring arrangement wherein the friction unit is free to turn at either of opposite ends thereof to provide arcuate shoe braking during brake application with either direction of vehicle movement.

Other features of the invention include a lateral locating means for the friction units which ensures proper positioning relative to the engageable surfaces of the stator.

Of further significance in the invention is the provision for extending the jackshaft through the center of the brake so that other implements may be driven by the extended end of the jackshaft which passes through the rotor and stator.

Other objects and features of the invention will become apparent from the consideration of the following description which proceeds with reference to the accompanying drawings wherein:

Figure 1 is a side elevation of the friction device with a portion thereof broken away to better illustrate construction and location of the friction units;

Figures 2, 3 and 4 are section views taken on the respective lines 2—2, 3—3 and 4—4, indicated in Figure 1;

The friction device in the present invention is located at the jackshaft of the tractor instead of the wheel to enable a lower order of torque loads which must be exerted by the brake. Also, locating the brake at the jackshaft rather than the wheel, makes it possible to raise the level of the axle shaft to increase the height between the undercarriage of the tractor and the ground thus preventing damage to crops.

Figure 6:
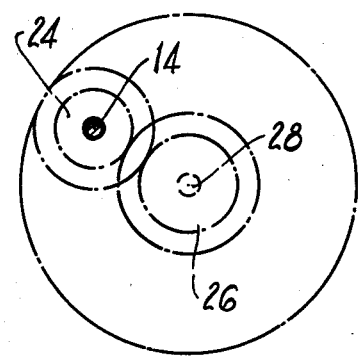
Figure 6 is a schematic view of the tractor wheel shown looking in the direction indicated by the arrows 6—6 in Figure 5; and, Figure 7 is a combination schematic and force diagram showing the direction and location of the brake applying forces during actuation of the friction device.
Figure 5:
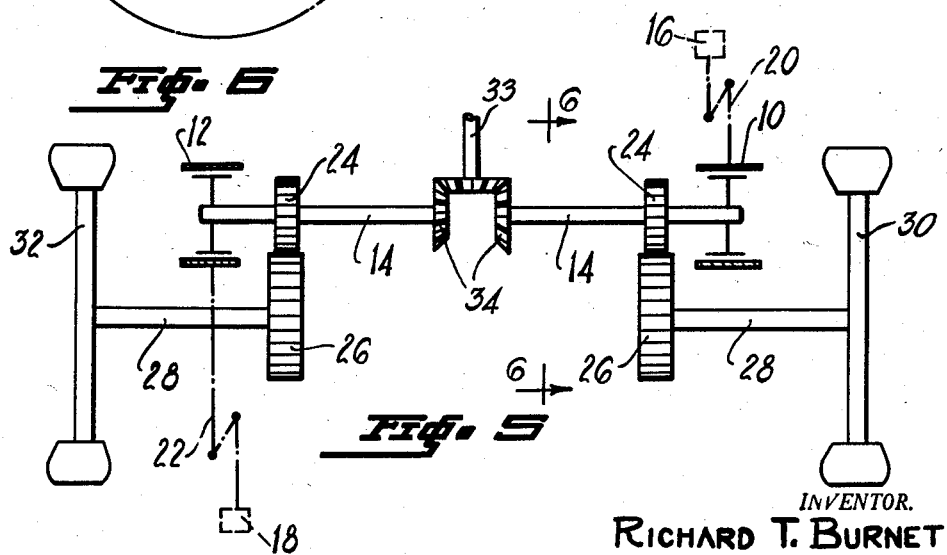
Figure 5 is a schematic view of the tractor braking system.

Referring to Figures 5 and 6, friction devices 10 and 12 are located at the right hand and left hand side of jackshaft 14. The friction devices (brakes) are operated by pedals 16 and 18 which are independently operatable through linkages 20 and 22. Also, connected to the jackshaft are differential pinion gears 24 which mesh with bull gears 26 carried on the ends of axle shafts 28. The right and left hand rear tractor wheels 30 and 32 are mounted on the axle shafts 28. It will be apparent that operation of the friction device will hold the jackshaft against rotation and, thus, lock the pinion gear, bull gear, and axle shaft against turning to brake the tractor wheel.

The wheels are driven by a drive shaft 33 which acts through a differential 34. It is possible by operating one or the other of the foot pedals 16 or 18 to brake the wheel and permit the tractor engine to drive the unbraked wheel through the drive shaft 33, differential housing which is free to operate one of the tractor wheels even though the other is locked.

Referring to Figures 1 through 4, the construction of the friction device will be more particularly described. The jackshaft 14 extends through transmission case 40 and is supported thereon through bearing 42 and bearing carrier 44. A bearing cap 48 is fastened to the bearing carrier 44 at one end by bolts 50 and bears against one race of the bearing 42 to hold it in place.

A stator, designated generally by reference numeral 52, is fastened to a flange 54 of the bearing carrier 44 by means of a number of spaced bolts or the like 56. The stator 52 consists of an annular laterally offset braking surface 58, a cylindrical surface 60, and a laterally movable pressure plate 62, having an offset friction surface 64 and a circular flange 66 which is slidably mounted on the cylindrical surface 60 of the stator 52.

An end plate or backing plate 68 is secured to the cylindrical portion 60 of the stator by means of bolts 70. A number of shims 72 are located between the backing plate 68 and cylindrical portion 60 so that the pressure plate 62 may be advanced toward the right to adjust for lining wear of the brake units.

Between the pressure plate 62 and backing plate 68 is an applying lever 74. The applying lever 74 consists of a ring portion 76 with an opening 78 which enables fitting the ring portion over the pressure plate 62. Camming devices 80 are spaced around the applying lever. The camming devices consist of conical recesses 82 in the backing plate 68, applying lever 74 and pressure plate 62. Balls 84 are then mounted within these recesses and are arranged to ride up the recess when relative turning occurs between the applying lever and the backing plate 68 to cam the pressure plate toward the right. The pressure plate 62 is urged to retracted position by a spring 86 which is compressed between the pressure plate at one end and the end flange 88 of a removable cup-shaped member 92 which extends through openings 93 and 94 in the pressure plate and backing plate. A shoulder 95 is formed which has abutting contact with the outer side of the backing plate.

A handle 96 is provided on the applying lever and an opening 98 may be included for connection with applying linkages to rotate the applying lever and thus apply the brake.

Located between the sides of the stator is a torque plate 100 which has a splined connection 102 with the jackshaft 14. The splined connection permits slight lateral movement of the torque plate but prevents relative circumferential movement between the torque plate and the jackshaft. The torque plate 100 has two radially extending projections which serve as anchors 108 and 110 for brake units 112 and 114. Each anchor 108, 110 includes a small pad of friction material 115 which prevents rubbing engagement between the relatively fixed stator and the anchor. This is not, however, essential to the invention and may be omitted.

Each of the brake units is identically constructed so that only one need be described. Friction unit 114 comprises a web 116, having a friction material lined rim 118, and a number of spaced friction pads 120 that are secured to opposite sides of the web. The friction unit is guided laterally by guide arms 122 and 124 which loosely embrace opposite sides of the web 116. The guide arms are offset portions of reinforcing plate 126 and torque plate 100. It will be noted that a second reinforcing plate 128 is provided at the central portion of the torque plate in order to stiffen the torque plate and provide additional bearing between the torque plate and the jackshaft. The reinforcing plates make it possible to withstand heavy torque loads during braking.

Figure 1:
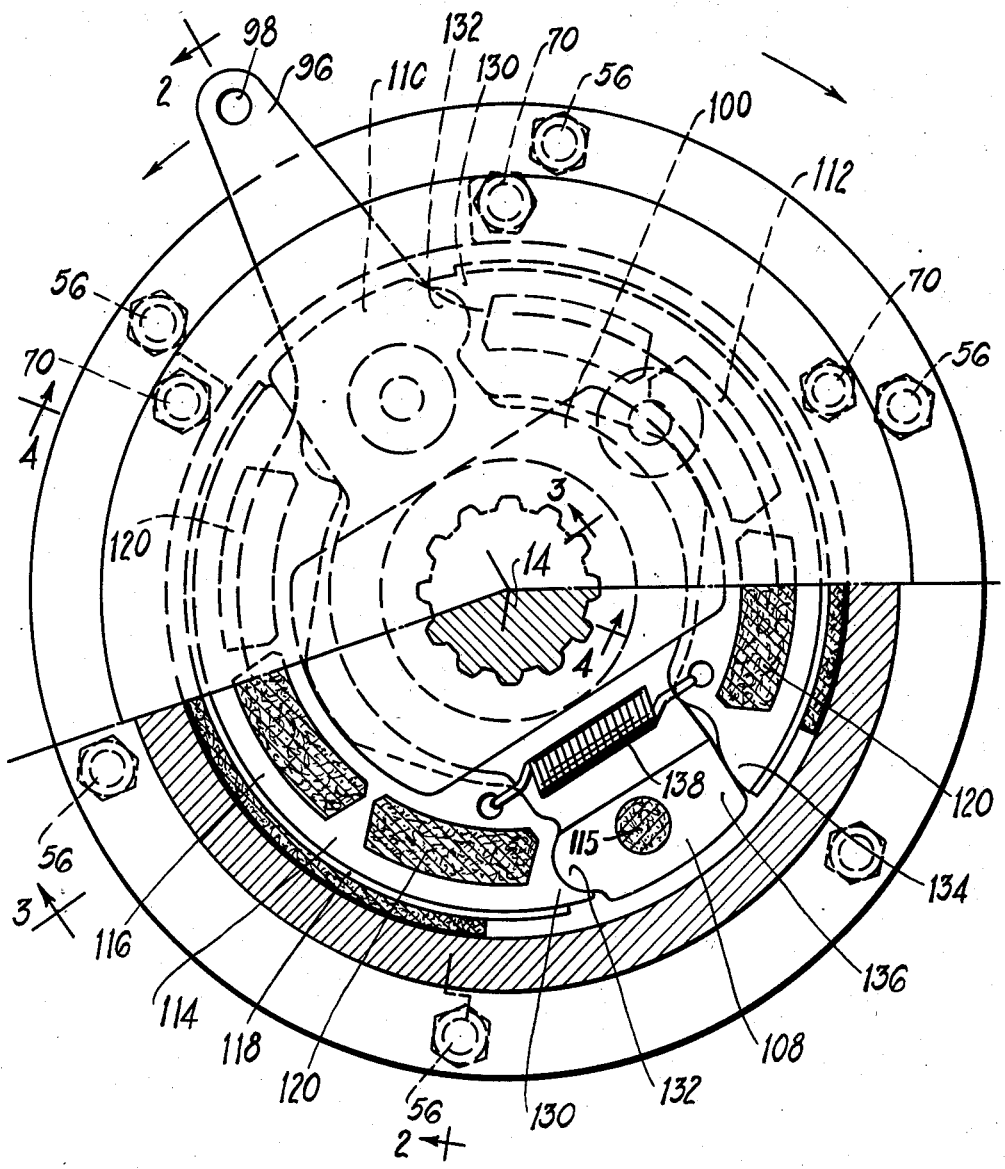

The opposite ends of each friction unit engage anchors 108 and 110. End 130 of the web is notched and contacts a curved end 132 of anchor. End 134 of the web is convexly shaped and contacts a flattened side 136 of the anchor. End 134 is free to pivot and slide radially on the associated side 136 of the anchor so that during braking while the end 134 of the web anchors, the unit will be free floating and will thus assume its correct radial location. On the other hand, if braking should produce anchoring of end 130 on anchor 108 the end 130 will pivot but is prevented from sliding movement so that in this instance the unit acts as a fixed anchor. Referring to Figure 1, it will be noted from the anchor construction and shoe arrangement that the shoes anchor at opposite ends on the different anchors in each direction, the result being that either both of the units are free floating or both are fixed, depending upon the direction of braking.

Adjacent ends of the units are held in contact with the anchor by means of return springs 138, which are fastened between adjacent expansible ends of the units. The springs 138 maintain ends 134 and 130 in contact with opposite sides of the respective anchor to hold the shoe friction element of the unit in a normally released position.

The spring 138, by maintaining end 130 in contact with the anchor, also serves to suspend the unit because engagement of the end 130 with the associated side 132 of the anchor prevents radial movement of the friction unit. It will be noted from Figure 2 that the spring 138 is located approximately coplanar with the anchor 110. Because of this, the anchor does not introduce offset loading which tends to tilt the shoes laterally on the anchor.

Operation of the friction device

Assume that the vehicle wheel is traveling in a direction producing clockwise movement of the brake units (Figure 1). The jackshaft 14 turns clockwise and, through the splined connection with the torque plate 100, drives the friction units therewith. The brake is applied by rotating applying lever in a counterclockwise direction (Figure 1). When the lever 96 is rotated, it moves relatively to the backing plate 68 and pressure plate 62. The camming devices 80 then impart lateral thrust on the pressure plate 62.

Figure 2:
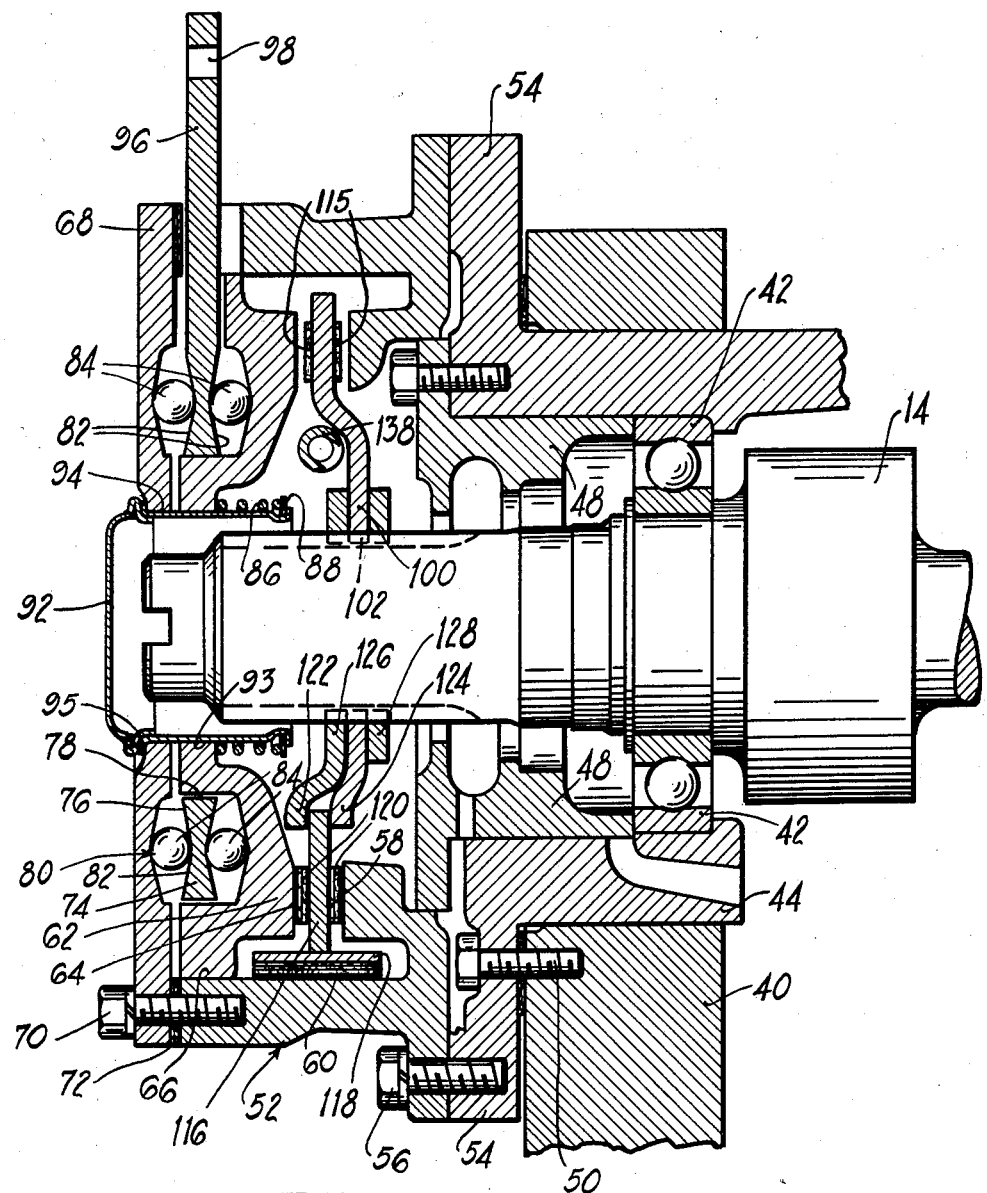
Figure 3:
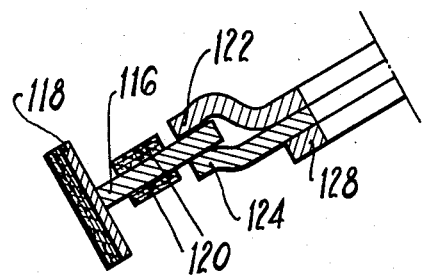
Figure 4:
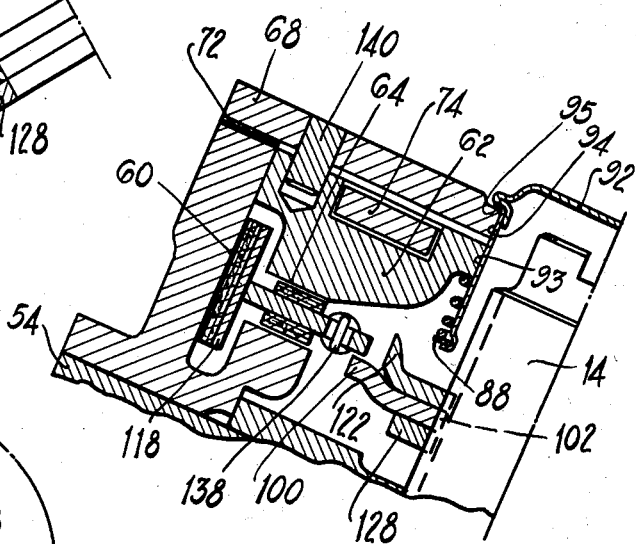

Referring to Figure 2, the pressure plate 62 is forced toward the right by operation of the applying lever so that the friction material lining 120 of the respective brake units is clamped between the sides 58 and 64 of the stator. A series of pins 140 (Figure 4) which are fixed in the reaction plate 68 prevent circumferential movement of the pressure plate 62 when it engages the friction unit. (Figure 4.) It will be noted in Figure 2 that the movement of the pressure plate toward an applying position is against the resistance of spring 86.

Rotation of the friction units in a clockwise direction, after they are clamped between the sides of the stator, produces a tendency of the unit to pivot on anchors 108 and 110. Brake unit 112 pivots at end 130 on anchor 110 and brake unit 114 pivots at end 130 in contact with anchor 108. This pivotal movement of the brake units brings the friction material lined rim 118 into forcible engagement with the cylindrical surface 60 of the stator. It will therefore be seen that operation of the friction device provides a combination of both "disk" and "shoe" braking.

As the jackshaft 14 is rotating clockwise the friction devices 10 and 12 are also driven clockwise and as they are driven between the sides of the rotor the engagement of the nonrotatable sides of the stator 52 with pads 120 produces a frictional "wiping" force giving rise to frictional forces which are in the direction and location indicated by reference numeral 121 in Fig. 7. The location of these forces relatively to anchors 108 and 110 develops force couples which tend to rotate the respective friction devices about ends 130 thereby causing the friction material lined rim 118 to engage the cylindrical surface 60 of the stator. When friction material lined rim 118 forcibly engages with surface 60 of the stator, there is a reaction force by the stator indicated by the reference numeral 119.

It will be noted from a consideration of these various forces and their locations which are present during the braking cycle, that the friction unit is caused to pivot in a direction oppositely to the direction of rotation of the jack shaft. In other words, the friction units are rotated in one direction, but pivot in an opposite direction owing to the dragging forces which are exerted by the fixed sides of the stator engaging the friction material 121 on the lateral sides of the friction devices. When the jackshaft rotates in a counterclockwise direction, the arrows 121 are reversed so that the force couple of the arrows 121 now causes a clockwise rotation of the friction devices about their respective ends 134.

When the brake is released, ends 134 of the unit are returned to their position against anchors 108 and 110 by the springs 138.

The spring 86 disengages the pressure plate 62 from the friction unit since it is urged toward the left in Figure 2. The pressure plate is one side of the stator. When the spring 86 moves the pressure plate toward the left, the camming devices rotate the lever 96 to its original position. A further return spring means may be provided for this lever rotating function if it is desired. No spring arrangement is necessary to disengage the friction element with side 58 of the stator; normal vibration of the unit is sufficient to withdraw it from frictional engagement therewith.

It will thus be seen that upon brake release, each of the sides of the brake unit are withdrawn from engagement with the associated side of the stator.

Assume next that brake operation occurs with reverse movement of the vehicle wherein the brake units are driven in a counterclockwise direction, referring to Figure 1.

The jackshaft 14 rotates in a counterclockwise direction, thus rotating the torque plate 100 and driving the friction units therewith in a counterclockwise direction. The brake is applied by rotating the lever 96 in a counterclockwise direction just as in braking with forward direction of vehicle movement. The pressure plate 62 is forced toward the right (Figure 2), and clamps the brake unit between sides 62 and 58 of the stator. Clamping the sides of the unit between the circumferentially fixed sides of the stator causes the friction units to pivot on ends 134 at the associated sides 136 of anchors 108 and 110, respectively. Pivotal movement applies the friction material lined rim 118 against the cylindrical portion 60 of the stator 52.

It will be noted from the construction of the ends of the unit and associated side of the anchor that the brake unit is free floating during braking in this direction of rotation. That is, the unit is too free to slide radially on its associated side 136 of the anchor to bring the friction material lined rim 118 into concentricity with the engageable portion 60 of the stator 52.

When the brake is released, the springs 138 return ends 134 into engagement with sides 136 of the anchor, thus releasing the friction material lined rim 118 from engagement with the cylindrical portion 60 of the stator 52. The spring 86 which is compressed during application of the brake moves the pressure plate 62 toward the left (Figure 2), thus disengaging surface 64 with the lining 120 at left hand side of the unit.

To compensate for normal wear of the lining 120 which is incident to brake usage, there are provided a number of shims 72 between the backing plate and the cylindrical portion 60 of the stator. The entire applying portion of the brake, consisting of the backing plate 68, applying lever 74, and pressure plate 62 is moved toward the right by removing the desired number of shims 72 and turning down bolts 70. This moves the surface 64 of the pressure plate 62 father toward the right (Figure 2) in order to reduce the clearance between the lining 120 and engageable sides of the stator.

No adjustment is provided for the shoe portion of the unit since brake noise is of only slight consideration in tractor braking. It is important, however, to provide adjustment for the disk elements of the brake unit since this is the part of the brake which is directly controlled by the operator and, hence, can develop the most adverse effects on the pedal travel as the result of wear of the lining.

An important feature of the invention is the relative ease with which the brake can be moved for service or replacement. Bolts 70 are removed. Removal of the bolts 70 permits withdrawal of the backing plate 68, applying lever 74, and pressure plate 62 as a unit. The cup 92 and spring 86 retain these components in an assembled relation so that the camming devices 80 and applying lever remain in assembled condition. Since these parts can be removed as a combination and are kept in operating position, this obviates disassembly of the unit part by part which is both time consuming and tedious. Following removal of the reaction plate, applying lever, and pressure plate, the brake units may be slipped off the torque plate by sliding the torque plate leftwardly on the jackshaft. The splined connection 102 permits this slidable movement.

Although the invention has been described in connection with a single selected embodiment, it will be understood by those skilled in the art that various modifications of the invention may be made without departing from the underlying principles thereof. Accordingly, it will be understood that the disclosed embodiment is only illustrative of the invention and not limitative thereof.

I claim:

1. A brake comprising a backing plate, a pressure plate, an applying lever arranged to exert thrust on said pressure plate, a plurality of camming devices between said backing plate and applying lever, a rotor, means for driving said rotor at the center thereof, a plurality of friction units arranged in end to end relation and having ends each of which forms a driving connection with means located at each of the ends of said friction units to provide pivotal movement of the friction units at each of said opposite driven ends, said friction units being thereby both pivoted and free floating at each of the opposite ends having said driving connection with said rotor, said friction units including oppositely facing friction elements and a transversely located friction element, a stator having two friction element engaging surfaces, said pressure plate being axially movable into frictional engagement with one of the oppositely facing friction elements of said units thereby forcibly engaging the other of said oppositely facing friction elements with a surface of said stator, the engagement of said pressure plate and stator with the oppositely facing friction elements producing pivotal actuation of said units on said anchoring means located at either of the ends of said units thereby applying the transversely located friction element thereof against the other surface of said stator, means for yieldably disengaging frictional contact of said pressure plate and stator with said brake units, and adjusting means threadedly received in said backing plate and stator to define the axial displacement therebetween determining the clearance of the oppositely facing friction elements of said units from said pressure plate and stator.

2. A brake comprising a backing plate, an axially movable pressure plate, an axially movable applying lever abutting said pressure plate, a plurality of camming devices interposed between said backing plate and applying lever for exerting brake applying thrust upon relative circumferential movement therebetween, a rotor, a plurality of friction units carried by said rotor, said rotor providing spaced anchoring means connected to adjacent ends of said friction units, means forming driving connections between each of the opposite ends of said friction units and said anchoring means and providing pivotal movement of said friction units at either of the opposite ends thereof, said friction units having two oppositely-faced friction material lined sides and a transverse friction material lined side, a stator having a disk-like surface and a transverse substantially cylindrical surface, axial actuation of said pressure plate producing frictional interengagement of the oppositely facing sides of said units with said stator and pressure plate thereby pivoting said said units on said driving connections at either of the opposite ends thereof to apply the transverse sides of said units against the cylindrical surface of said stator, means for yieldably disengaging the transverse sides of said units and the cylindrical surface of said stator, and means for yieldably urging said pressure plate to retracted position.

3. A brake comprising a rotatable member, at least one friction-producing unit carried by said member, said rotatable member including means provided at each of the opposite ends of said unit for rotatably driving said unit, said means providing anchoring surfaces upon which either of the ends of said units are arranged to pivot, said unit including three friction-producing elements, two of said elements being disposed as oppositely facing surfaces and the third element being disposed as a transverse surface of said unit, a stator having three friction element engaging surfaces located respectively adjacent the friction producing elements of said unit, one of the friction element engaging surfaces of said stator being axially movable to produce engagement of the oppositely facing surfaces of said unit and the sides of said stator adjacent thereto, said engagement producing pivotal actuation of said unit on said anchoring means at either of the opposite ends thereof to radially apply the third friction element thereof against an adjacent surface of said stator during breaking in either direction, means for yieldably disengaging the frictional contact of said elements with adjacent surfaces of said stator, and torque taking means preventing circumferential movement of said stator in either direction.

4. A brake comprising an axially movable rotor, a pair of rotatable brake units, anchoring means for said units secured to said rotor means located at the ends of said brake units and combined with said anchoring means to provide pivotal movement of the brake units at one or the other of said ends depending upon the direction of rotation of said rotor, said means forming a driving connection for said brake units through the ends thereof, each of said brake units including two spaced disk elements and an arcuate friction element disposed transversely to said disk elements, a two-part stator having spaced sides between which said disk elements are located, one of the parts of said stator being axially movable to establish frictional engagement between the disk elements of said units and said sides of said stator causing said units to turn at one or the other of said ends thereof to frictionally engage said arcuate friction element against said stator, a plurality of circumferentially spaced guide pins interconnecting the two parts of said stator, said guide pins being adapted to transmit torque reaction from engagement of the axially movable part of said stator with said brake units to the other part of said stator, and means for yieldably disengaging frictional application of the axially movable part of said stator with said brake units.

5. A kinetic-energy-absorbing device comprising a rotor, a rotor drive member having splined connection with said rotor permitting axial movement of said rotor, a pair of rotatable brake units, means located at each of the ends of said brake units and providing pivotal connections between the respective ends of said brake units and said rotor, said brake units being pivotal on said means at one or the other of the opposite ends thereof during braking and depending upon the direction of rotation of said rotor, three friction producing surfaces on each of said brake units, two of said surfaces constituting axially spaced disk elements and the third a shoe element, said shoe element being movable radially outwardly by pivotal movement of said unit at one end or the other of said opposite driven ends by torque reaction from braking of said disk elements, and a two-part stator, one part providing braking surfaces for one of said disk elements and said shoe element and the other part being axially movable into frictional contact with the other disk element of said brake units to thereby clamp the disk elements between said two parts of said stator, said driven member being extendible through both of the sides of said stator.

6. A kinetic-energy-absorbing device comprising a two-piece stator, a rotor, at least one rotatable brake unit, and means forming part of said rotor and adapted as a driving connection with said brake unit, and means located at each of the ends of said brake unit and combined with said drive connection to provide pivotal movement of the friction unit at one or the other of the ends thereof, said brake unit including axially disposed disk elements and a radially applied shoe element radially outwardly movable by pivotal movement of said unit at either of the ends thereof responsively to rotor rotation in one direction or the other during braking in either direction by torque reaction from engagement of said disk elements with said stator, one part of said two-piece stator being axially movable to clamp the disk elements of said brake unit between the two parts of said stator.

7. A brake comprising a U-shaped cross section drum having a relatively axially movable portion, a rotatable carrier plate having splined connection with a driven member permitting axial movement therebetween, and a plurality of composite disk and shoe brake units rotatably driven and pivotally associated at the remote ends of the units with anchoring means secured to said carrier plate, said units being pivoted at one or the other of remote ends thereof to radially apply the shoe portion of said unit with contiguous surface of said drum.

8. In a brake, a plurality of free floating composite disk and shoe brake units, a rotatable carrier plate, means forming a drivable connection between said rotatable carrier plate and said disk and shoe brake units, means combined with said drivable connections providing pivots for the ends of the respective disk and shoe brake units depending on the direction of rotation during braking, and a stator having a plurality of friction element engaging surfaces engageable with said units, a portion of said stator being relatively axially movable to apply said brake and thereby produce pivotal movement of said respective units at one or the other of the ends thereof to engage the shoe portions of said units with an opposing surface of said stator.

References Cited in the file of this patent

UNITED STATES PATENTS

| | | |
|---|---|---|
| 1,603,963 | Liebowitz | Oct. 19, 1926 |
| 1,928,630 | Penrose | Oct. 3, 1933 |
| 1,956,315 | Collins | Apr. 24, 1934 |
| 2,050,902 | Tatter | Aug. 11, 1936 |
| 2,065,382 | Levy | Dec. 22, 1936 |
| 2,086,538 | Dabney | July 13, 1937 |
| 2,262,708 | Lambert | Nov. 11, 1941 |
| 2,372,415 | Eksergian | Mar. 27, 1945 |
| 2,602,525 | Jurgens | July 8, 1952 |
| 2,629,473 | Vincent | Feb. 24, 1953 |
| 2,857,989 | Burnett et al. | Oct. 28, 1958 |

FOREIGN PATENTS

| | | |
|---|---|---|
| 1,098,952 | France | Aug. 29, 1955 |